US006641324B2

(12) United States Patent
Morsches et al.

(10) Patent No.: US 6,641,324 B2
(45) Date of Patent: Nov. 4, 2003

(54) JOINT ASSEMBLY AND JOINT SOCKET SLEEVE

(75) Inventors: Michael R. Morsches, Trumbull, CT (US); John L. Vitali, New Hartford, CT (US); Gordon C. Butterfield, Torrington, CT (US)

(73) Assignee: The Torrington Company, Torrington, CT (US)

( * ) Notice: Subject to any disclaimer, the term of this patent is extended or adjusted under 35 U.S.C. 154(b) by 27 days.

(21) Appl. No.: 09/976,405

(22) Filed: Oct. 12, 2001

(65) Prior Publication Data

US 2003/0072606 A1 Apr. 17, 2003

(51) Int. Cl.$^7$ .................................................. F16D 3/32
(52) U.S. Cl. ....................... 403/135; 403/133; 464/117; 464/118
(58) Field of Search ................................ 464/117, 118; 403/133, 135, 58, 200, 167, 197

(56) References Cited

U.S. PATENT DOCUMENTS

| | | | |
|---|---|---|---|
| 2,838,330 A | | 6/1958 | Fidler |
| 2,947,158 A | | 8/1960 | King |
| 3,120,746 A | * | 2/1964 | Kayser ........................ 464/118 |
| 3,226,141 A | | 12/1965 | Sullivan, Jr. |
| 3,301,008 A | * | 1/1967 | Beinke ........................ 464/118 |
| 3,445,131 A | | 5/1969 | Gottschald |
| 3,967,907 A | | 7/1976 | Schmidt |
| 4,207,757 A | * | 6/1980 | Onuma ........................ 464/118 |
| 4,318,627 A | | 3/1982 | Morin |
| 4,564,307 A | | 1/1986 | Ito |
| 4,577,988 A | | 3/1986 | Gollub et al. |
| 4,591,276 A | | 5/1986 | Schneider et al. |
| 4,606,668 A | | 8/1986 | Schmidt |
| 4,615,638 A | | 10/1986 | Ito |
| 5,509,748 A | * | 4/1996 | Idosako et al. ............. 403/135 |
| 5,525,110 A | | 6/1996 | Riccitelli et al. |
| 5,782,574 A | | 7/1998 | Henkel |
| 5,820,467 A | | 10/1998 | Fevre et al. |
| 5,823,881 A | | 10/1998 | Cornay |
| 5,954,586 A | | 9/1999 | Kirson |
| 6,139,435 A | | 10/2000 | Cornay |
| 6,203,438 B1 | | 3/2001 | Kirson |
| 6,231,264 B1 | | 5/2001 | McLaughlin et al. |

FOREIGN PATENT DOCUMENTS

| | | | |
|---|---|---|---|
| EP | 0 916 859 | 5/1999 | |
| EP | 0 922 869 | 6/1999 | |
| GB | 1054820 | 1/1967 | |
| WO | WO 9936707 A1 * | 7/1999 | ............. F16D/3/32 |

* cited by examiner

*Primary Examiner*—Lynne H. Browne
*Assistant Examiner*—Ernesto Garcia
(74) *Attorney, Agent, or Firm*—Michael Best & Friedrich LLP

(57) ABSTRACT

A joint assembly and a joint socket sleeve. The joint assembly includes a first yoke including a ball portion, a second yoke including a socket portion and a socket sleeve. The socket sleeve has a continuous side wall defining an opening for receiving the ball portion. A portion of the side wall is flexible. In some constructions, flat surfaces and/or grooves are formed on the outer surface of the socket sleeve. In some constructions, ribs are formed on the outer surface of the socket sleeve.

19 Claims, 2 Drawing Sheets

JOINT ASSEMBLY AND JOINT SOCKET SLEEVE

FIELD OF THE INVENTION

The invention relates to joint assemblies and, more particularly, to a socket sleeve for a joint assembly.

BACKGROUND OF THE INVENTION

Typically, a joint assembly, such as a constant velocity joint, is provided in a vehicle steering system. In general, a joint assembly includes a first yoke including a ball portion and a second yoke including a socket portion. The ball is received in the socket, and the opposite end of each yoke is connected to a separate rotating element, such as a shaft in the steering system.

SUMMARY OF THE INVENTION

The present invention provides a joint assembly and a joint socket sleeve which alleviates one or more problems with existing joint assemblies. The socket sleeve provides an interface to reduce potential friction and wear on the socket and the ball portion and provides a low friction, bearing surface for the ball portion. In some aspects of the invention, the socket sleeve reduces the torque required to rotate the joint by reducing the interference between the ball portion and the bearing surface of the socket sleeve. In some aspects of the invention, the socket sleeve eliminates hydraulic lock during installation into the socket and at a 0° operating angle of the joint assembly. In some aspects of the invention, the socket sleeve also allows a larger variation and a larger tolerance in the inner diameter of the socket and in the outer diameter of the ball portion.

More particularly, the present invention provides a joint assembly including a first yoke including a ball portion, a second yoke defining a socket, and a sleeve positionable in the socket, the sleeve having a continuous side wall defining an opening for receiving the ball portion, a portion of the side wall being flexible.

Also, the present invention provides a joint assembly including a first yoke including a ball portion having a ball outer surface, a second yoke defining a socket, and a sleeve positionable in the socket, the sleeve having a continuous side wall defining an opening for receiving the ball portion, the sleeve having a sleeve inner surface and a circumference, at least a portion of the sleeve inner surface being engageable with the ball outer surface. At a first circumferential position, the opening in the sleeve has a first diameter, and, at a second circumferential position, the opening in the sleeve has a second diameter, the second diameter being different than the first diameter.

In addition, the present invention provides a method of assembling a joint assembly, the method including the acts of providing a first yoke including a ball portion and a second yoke defining a socket, the socket having a socket inner surface, providing a sleeve positionable in the socket, the sleeve defining an opening for receiving the ball portion, the sleeve having a sleeve outer surface and a continuous side wall, a portion of the side wall being flexible, positioning the sleeve in the socket including engaging at least a portion of the sleeve outer surface with the socket inner surface, and positioning the ball portion in the opening in the sleeve including flexing the flexible portion of the side wall.

Independent features and independent advantages of the invention will become apparent to those skilled in the art upon review of the detailed description, claims and drawings.

Figure 1:
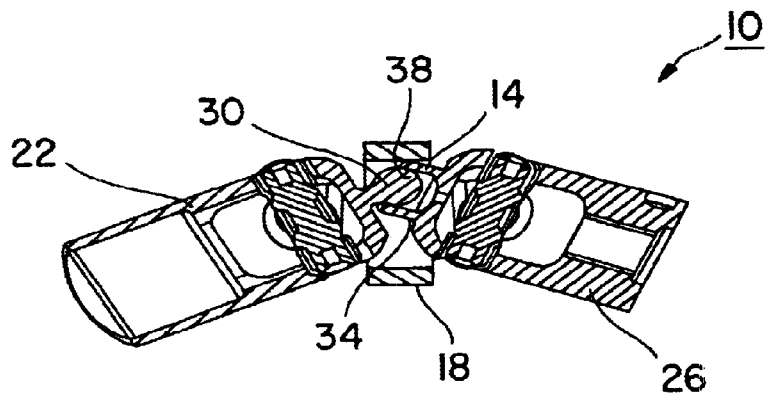
FIG. 1 is a cross-sectional side view of a joint assembly including a joint socket sleeve embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

A joint assembly 10, such as a constant velocity joint assembly, including a joint socket sleeve 14 embodying the present invention is illustrated in FIG. 1. The joint assembly 10 includes a housing 18 and a pair of yokes 22 and 26. The yoke 22 includes a ball portion 30, and the other yoke includes a socket 34. The yokes 22 and 26 are connected in a typical manner to rotating shafts (not shown) of a steering system (not shown). In order for the joint assembly 10 to be rotated without a wobble, the engagement between the ball portion 30 and the socket 34 (and the socket sleeve 14) provide a constraint to the joint assembly 10. It should be understood that the joint assembly 10 and the socket sleeve 14 may be used in other applications.

Figure 2:
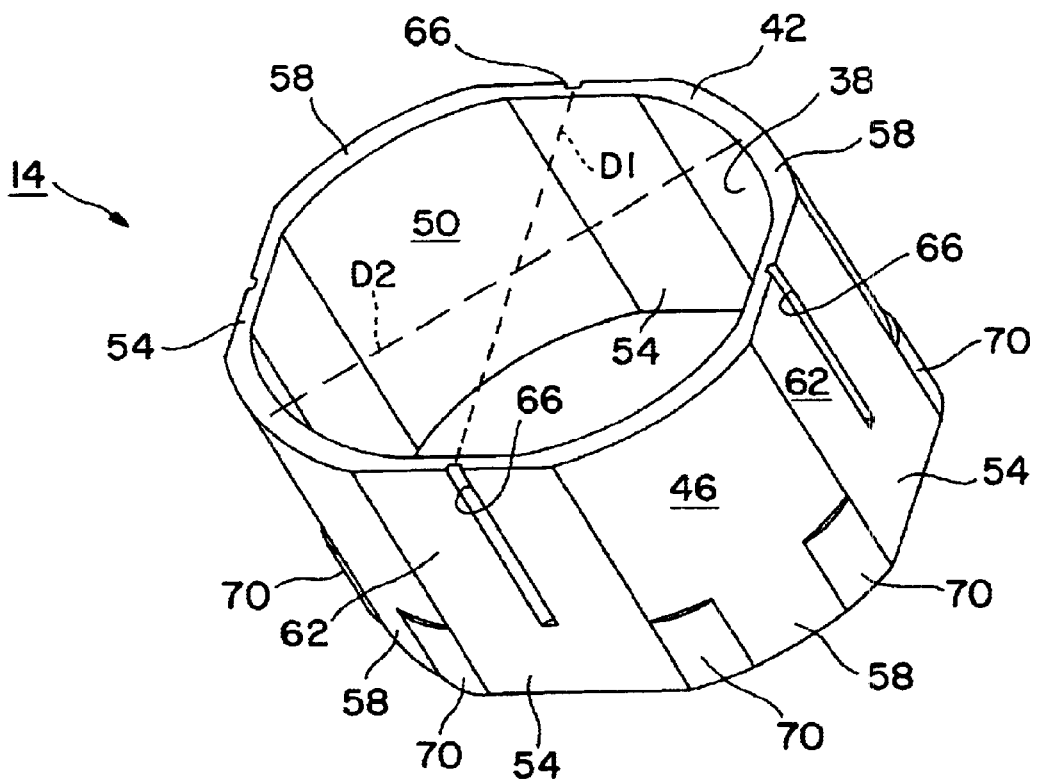
FIG. 2 is a perspective view of the joint socket sleeve shown in FIG. 1.
Figure 3:
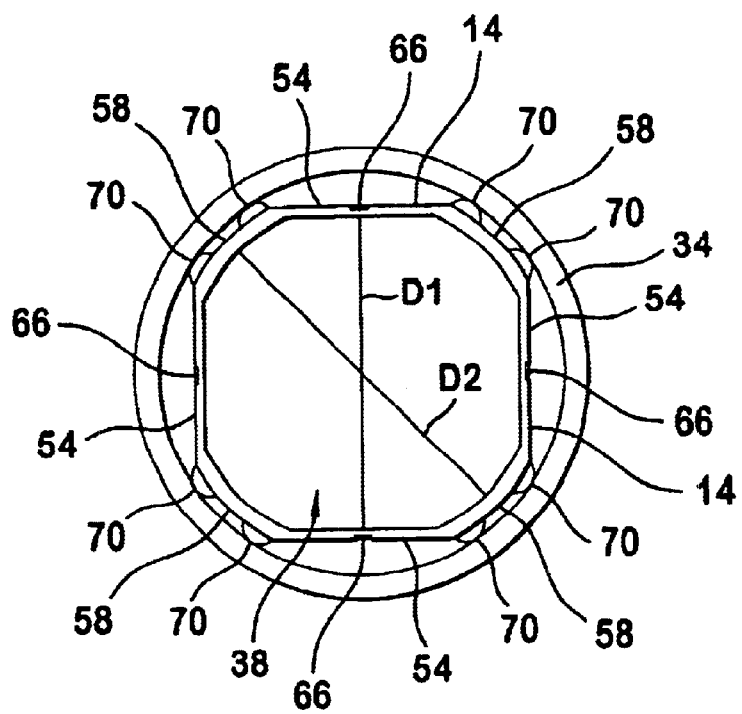
FIG. 3 is an end elevation view of the joint socket sleeve of FIG. 2 positioned in a socket.
Figure 4:
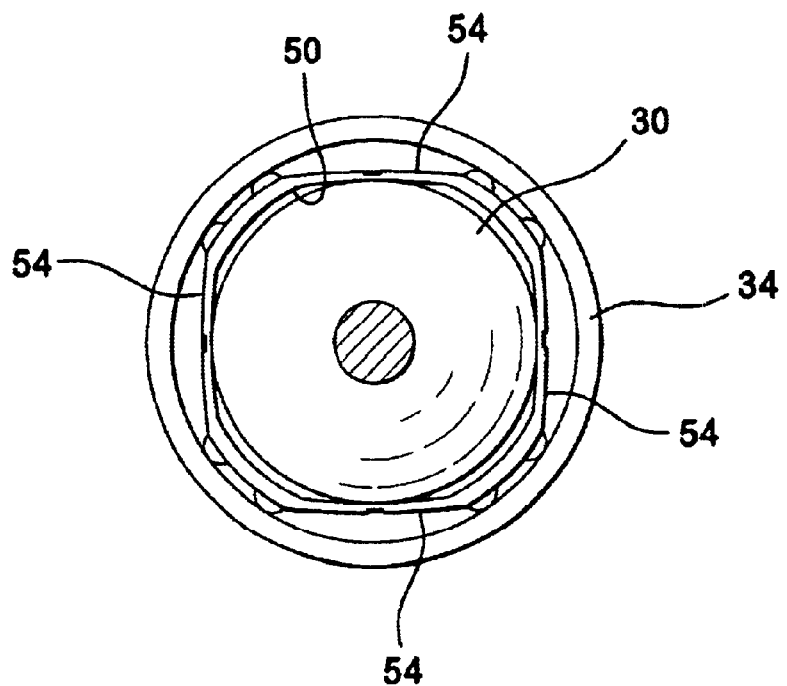
FIG. 4 is an end elevation view similar to that of FIG. 3 with a ball positioned in the socket.

As shown in FIG. 1, the socket sleeve 14 is positioned in the socket 34 and defines an opening 38 for receiving the ball portion 30. As shown in more detail in FIG. 2, the socket sleeve 14 includes a substantially continuous side wall 42 defining the opening 38 and having an outer surface 46 and an inner surface 50. As discussed below in more detail, the socket sleeve 14 provides a reduced-friction interface between the ball portion 30 and the socket 34. The socket sleeve 14 is preferably formed of a self-lubricating bearing material including a lubricant, such as, for example, molybdenum disulfide.

The side wall 42 includes at least one flexible portion 54 and, in the illustrated construction, includes four circumferentially-spaced flexible portions 54. Portions 58 are provided between adjacent flexible portions 54. In the illustrated construction, the flexible portions 54 have a reduced thickness, compared to the portions 58. Flat surfaces 62 are provided on the outer surface 46 of each flexible portion 54, and grooves 66 are formed in the flat surfaces 62. Radially-outwardly extending ribs 70 are provided on the outer surface 46.

In an unflexed position (shown in FIG. 2), a first diameter D1 is provided between opposite flexible portions 54, and the flexible portions 54 may be flexed to increase the distance therebetween. A second diameter D2 is provided between opposite portions 58. The second diameter D2 is greater than the first diameter D1 when the flexible portions 54 are in the unflexed position (shown in FIG. 2). Preferably, the second diameter D2 is larger than the outer diameter (OD) of the ball portion 30, and the first diameter D1 is smaller than the OD of the ball portion 30.

To assemble the joint assembly 10, the socket sleeve 14 is positioned in the socket 34. The flat surfaces 62 are spaced from the inner surface of the socket 34, and the outer surface of the portions 58, such as the ribs 70, engage the inner surface of the socket 34. The flat surfaces 62 and the grooves 66 allow air to escape from the socket 34 during installation of the socket sleeve 14 and during operation of the joint assembly 10, and, therefore, there is no hydraulic lock when the socket sleeve 14 is installed. The ribs 70 accommodate variations in the inner diameter (ID) of the socket 34, allowing larger tolerances in the ID of the socket 34.

The ball portion 30 is then inserted into the opening 38 of the socket sleeve 14. As discussed above, the OD of the ball portion 30 is preferably smaller than the second diameter D2 and larger than the first diameter D1. To accommodate the ball portion 30, the flexible portions 54 are flexed. The spacing between the flat surface 62 and the inner surface of the socket 34 accommodate the flexing of the flexible portions 54.

During operation of the steering system (not shown) and the joint assembly 10, the ball portion 30 engages only a portion of the inner surface 50 of the socket sleeve 14 on the flexible portions 54. This reduced contact and reduced interference between the ball portion 30 and the inner surface 50 of the socket sleeve 14 reduces the torque required for rotation of the components of the steering system.

Because the outer diameter of the ball portion 30 is smaller than the second diameter D2 of the socket sleeve 14, press fit parts are not required. The flexible portions 54, including the flat surfaces 62 and the grooves 66, provide a "lash-free" interference and react more like cantilevered springs than a press fit. The flexible portions 54 also accommodate variations in the OD of the ball portion 30, allowing larger tolerances in the OD of the ball portion 30.

Also, during operation of the joint assembly 10, air is allowed to escape from the joint assembly 10 because the flat surfaces 62 are sufficiently deep and spaced from the inner surface of the socket 34. Also, air is allowed to escape between the ball portion 30 and the inner surface 50 of the socket sleeve 14 because the ball portion 30 does not engage the entire circumference of the inner surface 50. For these reasons, there is no hydraulic lock at a 0° operating angle of the joint assembly 10.

Having described the invention, what is claimed is:

1. A joint assembly comprising:
    a first yoke including a ball portion;
    a second yoke defining a socket; and
    a sleeve positioned in the socket, the sleeve having a continuous side wall defining an opening for receiving the ball portion, a portion of the side wall being flexible, the opening being non-circular such that the opening, in a relaxed state, has at least first and second diameters that are distinct from one another.

2. The assembly as set forth in claim 1 wherein the socket has a socket inner surface, and wherein the sleeve has a sleeve outer surface and at least a portion of the sleeve outer surface does not engage the socket inner surface.

3. The assembly as set forth in claim 1 wherein the sleeve side wall includes at least one flexible portion positioned between two arcuate wall portions.

4. The assembly as set forth in claim 2 wherein the sleeve outer surface includes at least one radially-outwardly extending rib engaged with the socket inner surface.

5. The assembly as set forth in claim 3 wherein the at least one flexible portion is substantially flat.

6. The assembly as set forth in claim 3 wherein the opening extends along an axis, and wherein the at least one flexible portion of the sleeve wall includes an axially-extending groove.

7. The assembly as set forth in claim 1 wherein the sleeve has a sleeve inner surface, and wherein the ball portion has a ball outer surface and at least a portion of the sleeve inner surface does not engage the ball outer surface.

8. The assembly as set forth in claim 1 wherein the ball portion has an outer diameter, and wherein in the relaxed state, the ball portion outer diameter is greater than the first diameter of the opening and the ball portion outer diameter is less than the second diameter of the opening.

9. The assembly as set forth in claim 8 wherein the side wall includes at least one flexible portion positioned between two arcuate wall portions, such that upon flexing of the at least one flexible portion, the first diameter of the opening is equal to the ball portion outer diameter and the second diameter of the opening is greater than the outer diameter of the ball portion.

10. The assembly as set forth in claim 1 wherein the sleeve is manufactured from a low friction material.

11. The assembly as set forth in claim 1 and further comprising a housing supporting the first yoke and the second yoke.

12. A joint assembly comprising:
    a first yoke including a ball portion having a ball outer surface;
    a second yoke defining a socket; and
    a sleeve positioned in the socket, the sleeve having a continuous side wall defining an opening for receiving the ball portion, the sleeve having a sleeve inner surface, the opening being non-circular such that the opening, in a relaxed state, has at least first and second diameters that are distinct from one another, such that a portion of the sleeve inner surface does not engage the ball outer surface.

13. The assembly as set forth in claim 12 wherein the side wall includes at least one flexible portion having a first thickness, and at least one other portion having a second thickness, the second thickness being greater than the first thickness.

14. The assembly as set forth in claim 13 wherein the socket has a socket inner surface, wherein the at least one portion of the side wall having the second thickness is engaged with the socket inner surface, and wherein the at least one portion of the side wall having the first thickness is spaced from the socket inner surface.

15. The assembly as set forth in claim 14 wherein the at least one portion of the side wall having the second thickness includes at least one radially-outwardly extending rib engageable with the socket inner surface.

16. The assembly as set forth in claim 14 wherein the at least one portion of the side wall having the first thickness is flexible.

17. The assembly as set forth in claim 14 wherein the at least one portion of the side wall having the first thickness is substantially flat.

18. The assembly as set forth in claim 17 wherein the opening extends along an axis, and wherein the at least one portion of the side wall having the first thickness includes an axially-extending external groove.

19. A method of assembling a joint assembly, the method comprising the acts of:
    providing a first yoke including a ball portion and a second yoke defining a socket, the socket having a socket inner surface;
    positioning a sleeve in the socket, the sleeve defining an opening for receiving the ball portion, the sleeve having a continuous side wall, a portion of the side wall being flexible, the opening being non-circular such that the opening, in a relaxed state, has at least first and second diameters that are distinct from one another; and
    positioning the ball portion in the opening in the sleeve.

* * * * *